United States Patent
Ohashi et al.

(10) Patent No.: US 10,557,232 B2
(45) Date of Patent: Feb. 11, 2020

(54) TREATMENT LIQUID COMPOSITION AND INK JET TEXTILE PRINTING METHOD

(71) Applicant: Seiko Epson Corporation, Tokyo (JP)

(72) Inventors: Masakazu Ohashi, Shiojiri (JP); Ryota Miyasa, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/023,653

(22) Filed: Jun. 29, 2018

(65) Prior Publication Data

US 2019/0003115 A1 Jan. 3, 2019

(30) Foreign Application Priority Data

Jun. 30, 2017 (JP) ................. 2017-128487

(51) Int. Cl.
*D06P 5/30* (2006.01)
*B41J 3/407* (2006.01)
*B41J 11/00* (2006.01)
*D06P 3/52* (2006.01)

(52) U.S. Cl.
CPC .............. *D06P 5/30* (2013.01); *B41J 3/4078* (2013.01); *B41J 11/0015* (2013.01); *D06P 3/52* (2013.01)

(58) Field of Classification Search
CPC ........ C09D 11/30; C09D 11/54; C08K 5/098; C08K 3/16; C08K 3/28
USPC ...................................... 347/21, 95
See application file for complete search history.

(56) References Cited

U.S. PATENT DOCUMENTS

2013/0278690 A1   10/2013  Saito et al.

FOREIGN PATENT DOCUMENTS

| JP | 11-269783 A | 10/1999 |
| JP | 2000-110084 A | 4/2000 |
| JP | 2009-299240 A | 12/2009 |

OTHER PUBLICATIONS

Extended European Search Report for Patent Application No. 18180775.1, dated Sep. 27, 2018 (6 pages).

*Primary Examiner* — An H Do
(74) *Attorney, Agent, or Firm* — Harness, Dickey & Pierce, P.L.C.

(57) ABSTRACT

A treatment liquid composition for use in ink jet pigment textile printing and used by attaching it to fabric contains a cationic compound, at least one compound selected from polyvinylpyrrolidones, polyethylene oxides, carboxymethyl celluloses, hydroxyethyl celluloses, and polyvinyl alcohols, and water. The fabric contains polyester.

18 Claims, 1 Drawing Sheet

TREATMENT LIQUID COMPOSITION AND INK JET TEXTILE PRINTING METHOD

BACKGROUND

1. Technical Field

The present invention relates to a treatment liquid composition and an ink jet textile printing method.

2. Related Art

Fabric containing polyester fiber has been widely used in recent years, for example in sportswear, for reasons such as its high durability and low absorbency (quick-drying properties). In the related art, a technology of pretreating such polyester-containing fabric before ink jet textile printing has been known. For example, JP-A-2000-110084 and JP-A-11-269783 propose technologies such as fabric treatment agents for use with fabric made from polyester fiber in dye-ink-based ink jet textile printing.

Simpler than dye-ink-based one in operations such as fixation and washing, pigment-ink-based ink jet textile printing has been growing in uses, primarily on materials such as cotton fabric. In the related art, a technology of pretreating cotton fabric or a similar material in such pigment-ink-based ink jet textile printing has also been known. For example, JP-A-2009-299240 proposes a pretreatment agent for use in pigment-ink-based ink jet textile printing that contains components such as a multivalent metal salt and a polyacrylamide.

SUMMARY

More recently, diversified tastes of customers have led to a demand for technologies by which images, patterns, and the like can be formed on colored fabric (material), such as colored polyester, by ink jet textile printing. However, the fabric treatment agent described in JP-A-2000-110084 and the aqueous treatment liquid in JP-A-11-269783 fail to improve color appearance in textile printing on dark-colored material. Specifically, the technologies proposed in JP-A-2000-110084 and JP-A-11-269783 use dye as a coloring material. This means that if the material is in a dark color, textile printing often fails to mask the color of the material, and the color of the resulting images and the like can be affected by the color of the material. Using discharge printing to counter this can impair the convenience of ink jet textile printing by complicating the printing process.

The pretreatment agent described in JP-A-2009-299240 is disadvantageous in that it can be less effective in improving color appearance well when polyester fabric is used. Specifically, when this pretreatment agent is applied as an aqueous solution to a 100% cotton T-shirt colored black followed by ink jet textile printing with a white ink (white pigment ink), the aqueous pretreatment agent is often repelled easily by the polyester fiber and is difficult to fix on the fiber because of low hydrophilicity of polyester fiber compared with that of cotton fiber. That is, on polyester fiber, the functions of the pretreatment agent, such as filling fiber pores and masking the color of the substrate, can be inhibited. In particular, polyester fiber-containing fabrics used for making sportswear or similar clothes have relatively large pores therein (or are coarse) so that they breathe well. Insufficient fixation of a pretreatment agent on such a fabric having large pores can cause the components of the pretreatment agent to sink into the pores, resulting in a worsening of strike-through of pigment despite the pretreatment.

That is, there has been a need for a technology that reduces the strike-through and improves the color appearance of pigment even on dark-colored polyester fabric.

The following describes some aspects or exemplary applications of the invention.

Application

A treatment liquid composition according to this application is for use in ink jet pigment textile printing and is used by attaching it to fabric. The treatment liquid composition contains at least one cationic compound; at least one compound selected from polyvinylpyrrolidones, polyethylene oxides, carboxymethyl celluloses, hydroxyethyl celluloses, and polyvinyl alcohols; and water. The fabric contains polyester.

This application, in printing on polyester-containing fabric such as a dark-colored polyester fabric using ink jet textile printing, reduces the strike-through and improves the color appearance of the pigment. Specifically, polyvinylpyrrolidones, polyethylene oxides, carboxymethyl celluloses, hydroxyethyl celluloses, and polyvinyl alcohols are compounds whose polymer chains easily tangle with fiber of polyester-containing fabric. These compounds, moreover, generally give a treatment liquid composition a relatively high viscosity when contained therein. By virtue of these, the treatment liquid composition does not easily sink into pores in the fabric, its pore-sealing effect is enhanced, and the components of the treatment liquid composition can be held more easily on the surface of the polyester fabric than in the related art. The improved fixation of the treatment liquid composition on the polyester fabric leads to fiber of the polyester fabric being coated with the treatment liquid composition. As a result, in the process of ink jet pigment textile printing, the treatment liquid composition functions more fully, for example at sealing of fiber pores and induction of aggregation, than those in the related art. Furthermore, the coating of hydrophobic polyester with the treatment liquid composition provides improved compatibility between the polyester fabric and pigment ink by making the aforementioned compound mediate between the polyester and pigment ink. Overall, the treatment liquid composition reduces strike-through by helping hold the pigment and other components of the ink on the front side of the polyester fabric, and improves color appearance better than those in the related art even on dark-colored material by virtue of the action of the cationic compound helping the pigment aggregate.

Relatively highly soluble in water, polyvinylpyrrolidones, polyethylene oxides, carboxymethyl celluloses, hydroxyethyl celluloses, and polyvinyl alcohols can be used with a higher molecular weight than compounds less soluble in water. Since the molecular chains of a compound become longer with increasing molecular weight, compounds with higher molecular weights more easily tangle with fiber of the polyester fabric and improve the fixation of the treatment liquid composition on the polyester fabric better than those with lower molecular weights.

Preferably, the treatment liquid composition according to this application is for use in textile printing with a white pigment ink.

This allows a primer layer better in color appearance than in the related art to be formed on the polyester fabric using a white pigment ink. Such a primer layer allows images, patterns, and the like to be formed in a desired color tone thereon. Moreover, the improved color appearance of the white pigment leads to reduced strike-through of the white pigment because the amount of white pigment ink that needs to be applied is smaller.

Preferably, the fabric used with the treatment liquid composition according to this application is colored fabric.

This ensures, in ink jet pigment textile printing, that the color of the material is masked, and therefore the interference of the color of the material is reduced, by virtue of the improved color appearance of the pigment. That is, the treatment liquid composition according to this application is suitable for use with colored polyester fabric. By using colored fabrics, moreover, a manufacturer can provide printed fabrics (products) that meet its customers' tastes.

Preferably, in the treatment liquid composition according to this application, the at least one cationic compound is at least one of multivalent metal salts and cationic polymers.

This further improves the color appearance of the pigment by promoting the aggregation of the pigment and other components of the ink.

Preferably, in the treatment liquid composition according to this application, the amount of the at least one compound selected from polyvinylpyrrolidones, polyethylene oxides, carboxymethyl celluloses, hydroxyethyl celluloses, and polyvinyl alcohols is 0.5% by mass or more and 6.0% by mass or less of the total mass of the treatment liquid composition.

This ensures that the pore-sealing effect of the treatment liquid composition is viable even on a polyester fabric with relatively large pores, and further improves color appearance. Moreover, this arrangement helps maintain the texture of the polyester fabric by limiting the hardening of the fabric after the attachment of the treatment liquid composition.

Preferably, the treatment liquid composition according to this application further contains fine particles of resin.

This enhances the pore-sealing effect of the treatment liquid composition on polyester fabric. Adding fine particles of resin also provides an additional improvement in the fixation of the components of the treatment liquid composition and the pigment, thereby improving the abrasion and wash resistance of the printed fabric produced by the ink jet pigment textile printing process.

Application

An ink jet textile printing method according to this application includes attaching the treatment liquid composition according to the above application to fabric.

This application provides a method by which ink jet textile printing can be performed on polyester fabric with less frequent strike-through and improved color appearance. Moreover, the use of ink jet textile printing makes this method easily applicable to high-mix low-volume production, for reasons such as not requiring a printing plate that is essential in analog textile printing, and allows for high-resolution printing, for example of images.

Preferably, the ink jet textile printing method according to this application further includes, after the attaching the treatment liquid composition to the fabric, heating at a temperature of 140° C. or less.

This allows, even when the polyester fabric (material) has been colored with a disperse dye (sublimation dye), the treatment liquid to be dried with less discoloration of the material caused by heating. Specifically, setting the heating temperature to 140° C. or less limits the sublimation of the disperse dye with which the material has been dyed, thereby controlling the associated discoloration of the material. Even with heating at relatively low temperatures of 140° C. or less, the color appearance of the pigment is improved.

Preferably, the ink jet textile printing method according to this application further includes attaching a white pigment ink by ink jetting to the region to which the treatment liquid composition has been attached.

This provides an ink jet textile printing method for forming a white primer layer better in color appearance than in the related art and then an image or pattern, for example, a desired color tone on the primer layer.

Preferably, in the ink jet textile printing method according to this application, the amount of white pigment ink attached to the fabric is 500 g/m$^2$ or less.

This makes the strike-through of the white pigment ink less frequent by reducing the amount of it attached, without compromising the color appearance of the white pigment.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
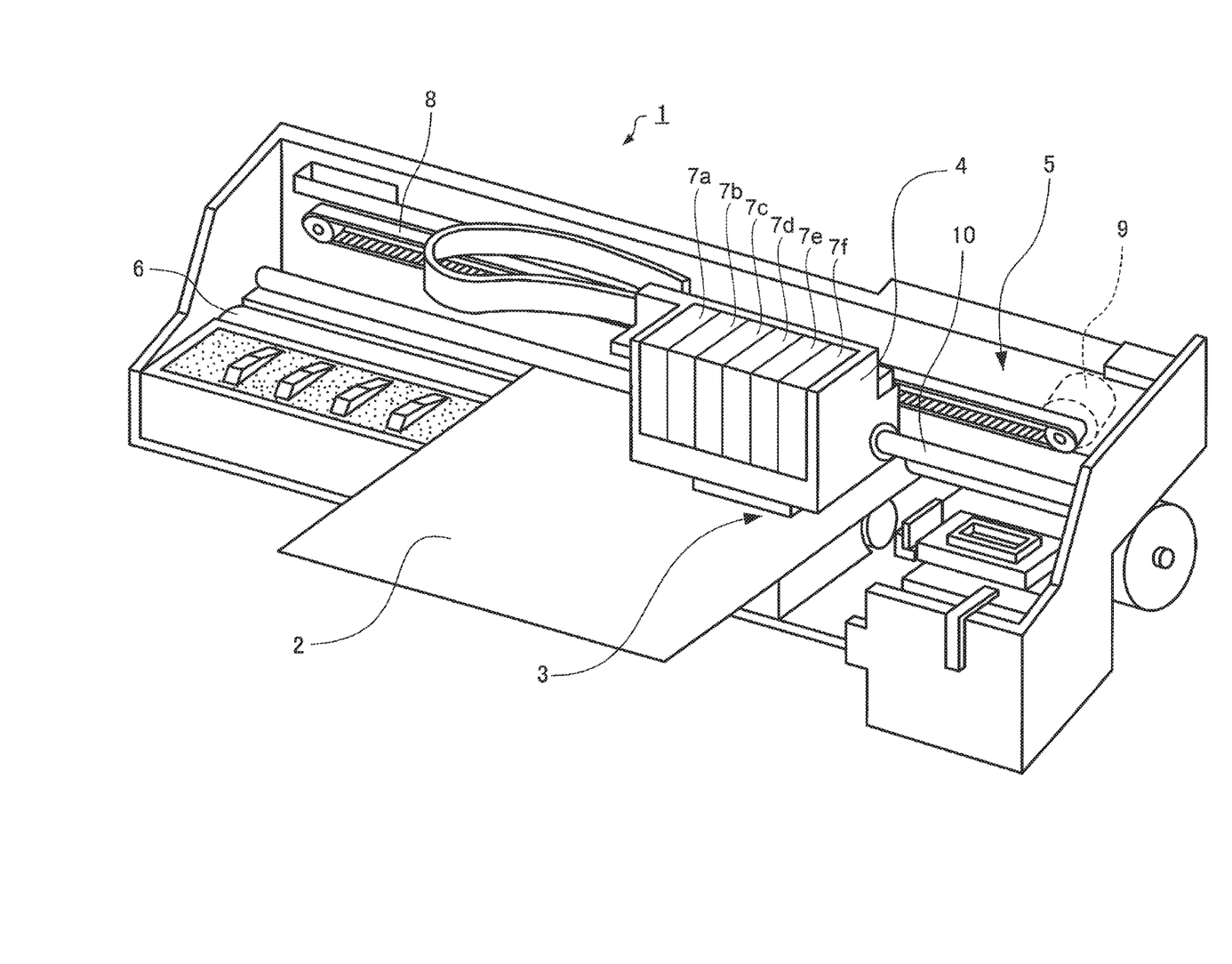
FIGURE is a schematic perspective view of an ink jet textile printing device according to an embodiment.

The following describes an embodiment of the invention. It should be noted that the following embodiment is only illustrative of the invention. The invention is not limited to this embodiment, and modifications can optionally be made without departing from the spirit and scope of the invention, which can be read from the claims and the entire specification. Treatment liquid compositions and ink jet textile printing methods to which such modifications have been made are also included in the technical scope of the invention.

Treatment Liquid Composition

A treatment liquid composition (hereinafter also simply referred to as "treatment liquid") according to this embodiment is used in the production of a printed fabric by the application of a pigment ink composition (textile printing) and is used by preliminarily attaching it to polyester-containing fabric (hereinafter also simply referred to as "polyester fabric") or any other material that serves as the base of the printed fabric. The pigment ink composition is applied by ink jetting. In ink jetting, tiny droplets of an ink composition are ejected from an ink jet head, for example of an ink jet printer. Textile printing that uses ink jetting is referred to as ink jet textile printing. When a pigment ink composition is used, textile printing is particularly referred to as ink jet pigment textile printing. The following first describes the individual components of a treatment liquid according to this embodiment. In this embodiment, an aqueous pigment ink composition (hereinafter also simply referred to as "pigment ink") is used by way of example.

A treatment liquid according to this embodiment is for use in ink jet pigment textile printing and is used by attaching it to fabric. The treatment liquid composition contains at least one cationic compound; at least one compound selected from polyvinylpyrrolidones, polyethylene oxides, carboxymethyl celluloses, hydroxyethyl celluloses, and polyvinyl alcohols; and water. The fabric contains polyester.

Cationic Compound

The cationic compound makes components of the pigment ink aggregate. Specifically, in the production of printed fabric, a pigment ink is applied to fabric to which the treatment liquid has been attached. The cationic compound in the treatment liquid acts on the pigment, fine particles of resin, and other components of the pigment ink, causing the pigment to aggregate. As a result, the color appearance of the pigment on the printed fabric is improved. Besides this, the cationic compound also serves to increase the viscosity of the pigment ink, by which the cationic compound reduces running and bleeding of the ink while preventing excessive permeation of the pigment ink into the fabric.

These functions of the cationic compound result from the action of the compound neutralizing the surface charge of components of the pigment ink or changing the pH of the pigment ink. Through these actions the cationic compound makes the pigment and other components of the pigment ink aggregate or separate out, and thickens the pigment ink.

The at least one cationic compound is preferably at least one of multivalent metal salts and cationic polymers. By using such a compound(s), the color appearance of the pigment can be further improved by promoting the aggregation of the pigment and other components of the ink. One of these cationic compounds may be used alone, or two or more may be used in combination.

Multivalent metal salts are compounds that contain a multivalent metal cation, having a valence of two or more, and an anion that forms a salt with the multivalent metal cation and are soluble in water. Examples of multivalent metal cations, having a valence of two or more, include divalent metal ions, such as $Ca^{2+}$, $Cu^{2+}$, $Ni^{2+}$, $Mg^{2+}$, $Zn^{2+}$, $Ba^{2+}$, and trivalent metal ions, such as $Al^{3+}$, $Fe^{3+}$, and $Cr^{3+}$. As for the anion, examples include $Cl^-$, $I^-$, $Br^-$, $SO_4^{2-}$, $CO_3^{2-}$, $ClO_3^-$, $NO_3^-$, $HCOO^-$, and $CH_3COO^-$. Among those multivalent metal salts formed by such multivalent metal cations and anions, calcium salts such as calcium chloride and calcium nitrate are particularly preferred from the aspects of the stability and effectiveness in inducing aggregation of the treatment liquid, more preferably calcium chloride. An exemplary form of calcium chloride that can be used is calcium chloride dihydrate. One multivalent metal salt may be used alone, or two or more may be used in combination.

Metal salts that are not multivalent may also be used. Examples of such metal salts include those formed by a monovalent metal cation, such as $Na^+$ or $K^+$, and one of the anions listed above, e.g., sodium sulfate and potassium sulfate.

As for cationic polymers, examples include urethane, olefin, and allylamine resins of cationic type.

For cationic urethane resins, known and/or commercially available ones can be used. A solution of a cationic urethane resin, for example in water or an organic solvent, can be employed, and water-soluble cationic urethane resins are preferred. Examples of such cationic urethane resins include Hydran® CP-7010, 7120, 7030, 7040, 7050, 7060, and 7610 (trade names, DIC Corporation).

Cationic olefin resins are polymers having a backbone structure derived from olefin monomers, such as an ethylene or propylene chain. Known and/or commercially available cationic olefin resins can be used. A solution of a cationic olefin resin, for example in water or an aqueous solvent, can be employed, and water-soluble cationic olefin resins are preferred.

For cationic allylamine resins, known ones can be used. Examples include polyallylamine hydrochloride, polyallylamine amidosulfate, allylamine hydrochloride-diallylamine hydrochloride copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine hydrochloride, polymethyldiallylamine amidosulfate, polymethyldiallylamine acetate, polydiallyldimethylammonium chloride, diallylamine acetate-sulfur dioxide copolymers, diallylmethylethylammonium ethyl sulfate-sulfur disulfide copolymers, diallyldimethylammonium chloride-sulfur disulfide copolymers, and diallyldimethylammonium chloride-acrylamide copolymers.

Commercial products of such cationic allylamine resins can also be used. Examples include PAA-HCL-01, 03, 05, 3L, 10L, PAA-H-HCL, PAA-SA, PAA-01, 03, 05, 08, 15, 15C, 25, PAA-H-10C, PAA-D11-HCL, PAA-D41-HCL, PAA-D19-HCL, PAS-21CL, 22SA, 92, 92A, PAS-M-1, 1L, 1A, PAS-H-1L, 5L, 10L, PAS-J-81, and 81L (trade names, Nittobo Medical) and Himoloc® NEO-600, Q-101, Q-311, Q-501, and Himax SC-505 (trade names, HYMO).

Among these cationic polymers, water-soluble ones are particularly preferred.

Other cationic compounds may also be used, such as cationic surfactants and inorganic and organic acids.

For cationic surfactants, examples include salts of primary, secondary, and tertiary amines, alkylamine salts, dialkylamine salts, aliphatic amine salts, benzalkonium salts, quaternary ammonium salts, quaternary alkylammonium salts, alkylpyridinium salts, sulfonium salts, phosphonium salts, onium salts, and imidazolinium salts. Specific examples of cationic surfactants include hydrochlorides, acetates, and other salts of laurylamine, coconut amine, and rosin amine, dodecyltrimethylammonium chloride (lauryltrimethylammonium chloride), hexadecyltrimethylammonium chloride (cetyltrimethylammonium chloride), benzyltributylammonium chloride, benzalkonium chloride, dimethylethyllaurylammonium ethyl sulfate, dimethylethyloctylammonium ethyl sulfate, cetylpyridinium chloride, cetylpyridinium bromide, dihydroxyethyl laurylamine, decyldimethylbenzylammonium chloride, dodecyldimethylbenzylammonium chloride, tetradecyldimethylammonium chloride, hexadecyldimethylammonium chloride, and octadecyldimethylammonium chloride. Cationic surfactants can also be used as the surfactant(s) as described hereinafter.

For inorganic and organic acids, examples include inorganic acids such as sulfuric acid, hydrochloric acid, nitric acid, and phosphoric acid, organic acids such as polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumalic acid, thiophene carboxylic acid, and nicotinic acid, derivatives of these compounds, and salts thereof. One of these may be used alone, or two or more may be used in combination.

There are other more cationic compounds that may be used. Examples include inorganic pigments, such as chalk, kaolin, fired clay, talc, titanium oxide, zinc oxide, zinc sulfide, synthetic silica, aluminum hydroxide, alumina, sericite, white carbon, saponite, calcium montmorillonite, sodium montmorillonite, and bentonite, and organic pigments, such as acrylic plastic pigments and urea polymers.

The amount of cationic compound in the treatment liquid is not critical, but preferably is 0.1% by mass or more and 40% by mass or less, more preferably 2% by mass or more and 25% by mass or less, even more preferably 5% by mass or more and 20% by mass or less, in particular 10% by mass or more and 20% by mass or less, of the total mass of the treatment liquid. By setting the cationic compound content within these ranges, the strike-through of the pigment on the printed fabric can be reduced and the color appearance, wash resistance, and abrasion resistance of the pigment improved by limiting the precipitation, separation, and other unwanted behavior of the cationic compound in the treatment liquid. As used herein, the term "strike-through" refers to a condition in which after a pigment ink is applied to a surface (front) of fabric by textile printing, the pigment and other components of the ink seep out by moving from the front side to the opposite (back) side. Strike-through can be conspicuous especially when the fabric is a white cloth or a white pigment is used on colored fabric.

Specified Compounds

The polyvinylpyrrolidones, polyethylene oxides, carboxymethyl celluloses, hydroxyethyl celluloses, and polyvinyl alcohols (hereinafter also referred to as "specified compounds") are preferably water-soluble polymer(s), preferably dissolved in the treatment liquid. The specified compounds have polymer chains that easily tangle with fiber of polyester fabric and generally give a treatment liquid a relatively high viscosity when contained therein. By virtue of these, the specified compounds help the attached treatment liquid stay on the surface of the polyester fabric. In the process of ink jet pigment textile printing on polyester fabric to which the treatment liquid has been attached, this function of the specified compound(s) reduces the strike-through and improves the color appearance of the pigment.

As used herein, the term "water-soluble" or "soluble in water" refers to being soluble in ion-exchanged water at 20° C. to a concentration of 3% by mass or more.

The amount of specified compound in the treatment liquid is preferably 0.5% by mass or more and 6.0% by mass or less, more preferably 1.0% by mass or more and 5.5% by mass or less, even more preferably 1.5% by mass or more and 4.5% by mass or less, of the total mass of the treatment liquid. By setting the amount of specified compound within these ranges, it can be ensured that the pore-sealing effect of the treatment liquid is viable even on a polyester fabric having relatively large pores, and color appearance can be further improved. Moreover, using such an amount of specified compound helps maintain the texture of the polyester fabric by limiting the hardening of the fabric after the attachment of the treatment liquid.

The polyethylene oxides that may be used include commercially available ones. Examples include PEO®-1, 2, 3, 4, 8, 15, 18, 27, and 29 (trade names, Sumitomo Seika Chemicals) and Alkox® L-6, L-8, L-11, E-30, E-45, E-60, E-75, E-100, E-160, E-240, E-300, R-150, R-400, and R-1000 (trade names, Meisei Chemical Works).

The polyethylene oxides are not limited to homopolymers but include, for example, copolymers of ethylene oxide and another monomer, such as copolymers of ethylene oxide and propylene oxide.

The weight-average molecular weight of a polyethylene oxide is not critical, but preferably is 1000 or more and 600000 or less, more preferably 10000 or more and 550000 less. When having such a weight-average molecular weight, the polyethylene oxide more effectively increases the viscosity of the treatment liquid, and its molecular chains more easily tangle with fiber of the polyester fabric. The weight-average molecular weight of compounds like polyethylene oxides can be measured by known methods, such as GFC (Gel Filtration Chromatography).

The carboxymethyl celluloses that may be used include commercially available ones. Examples include sodium salts of carboxymethyl cellulose, such as CMC Daicel® 1120, 1130, 1220, 1240, 1250, and 1330 (trade names, Daicel FineChem) and CELLOGEN® 5A, 6A, 7A, PL-15, F-5A, F-7A, F-907A, F-815A, and PR-S (trade names, DKS).

The hydroxyethyl celluloses that may be used include commercially available ones. Examples include HEC Daicel® SP200, SP400, SP500, SP600, SP850, SP900, SE400, SE550, SE600, SE850, SE900, and EE820 (trade names, Daicel FineChem) and AL-15, AG-15F, AH-15F, AV-15F, AW-15F, AX-15, SW-25F, SZ-25F, CF-G, CF-V, CF-W, CF-X, and CF-Y (trade names, Sumitomo Seika Chemicals).

The polyvinyl alcohols that may be used include commercially available ones. An example is POVAL® (Kuraray). The polyvinyl alcohols are not limited to homopolymers of vinyl alcohol but include any copolymer of vinyl alcohol and another monomer, such as vinyl acetate, as long as it is soluble in water.

The polyvinylpyrrolidones that may be used include commercially available ones. Examples include commercial reagents such as Poly vinyl pyrrolidone K-30 and K-30W (trade names, Nippon Shokubai), PITZCOL® K-17L, K-30L, K-30AL, K-60L, K-30, and K-50, CREEJUS® K-30, and AIPHTACT® K-30PH (trade names, DKS), and PVP K-30, PVP K-25, and PVP K-(trade names, Ashland). The polyvinylpyrrolidones are not limited to homopolymers but include copolymers of vinylpyrrolidone and another monomer.

The glass transition temperature of such a specified compound is not critical, but preferably is $-80°$ C. or more and $0°$ C. or less, more preferably $-80°$ C. or more and $-10°$ C. or less. When having such a glass transition temperature, the specified compound improves abrasion resistance and other properties of the printed fabric without compromising the texture of the material.

Other water-soluble polymers may also be used, such as hydroxypropyl methylcelluloses and cellulose acetates.

Water

Water is the primary solvent in a treatment liquid according to this embodiment. After the treatment liquid is attached to the polyester fabric, the water evaporates away by drying. Water treated to minimize ionic impurities can be used, examples of which include forms of purified water, such as ion-exchanged water, ultrafiltered water, reverse osmosis-water, and distilled water, and ultrapure water. Sterilized water, for example sterilized by ultraviolet radiation or the addition of hydrogen peroxide, will limit fungal and bacterial development in the treatment liquid when it is stored for a long period.

The water content of the treatment liquid is not critical, but for example is 30% by mass or more and 95% by mass or less, preferably 40% by mass or more and 90% by mass or less, more preferably 45% by mass or more and 85% by mass or less, even more preferably 50% by mass or more and 80% by mass or less, of the total mass of the treatment liquid. By setting the water content within these ranges, the treatment liquid can be made easier to handle during attachment to the polyester fabric and quicker to dry after attachment by ensuring that the treatment liquid is not too viscous. It should be noted that the water in the treatment liquid includes any other fraction of water used as a raw material for the treatment liquid, such as water in resin emulsion, which is described hereinafter.

Fine Particles of Resin

The treatment liquid may further contain fine particles of resin. By adding fine particles of resin, the fixation of the pigment in the pigment ink on the polyester fabric can be further improved. It is also possible to use fine particles of resin as a sealer, which prevents the treatment liquid and pigment ink from permeating into the polyester fabric excessively.

When water is the primary solvent in the treatment liquid as in this embodiment, the fine particles of resin are used as resin emulsion, a dispersion of the fine particles of resin in an aqueous solvent. The fine particles of resin can be dispersed by, for example, forced emulsification, in which an emulsifier (surfactant) is used, or self-emulsification, which is the introduction of a hydrophilic moiety (hydrophilic group) into the molecular structure of the fine particles of resin. The fine particles of resin may be reactive (capable of cross-linking). For example, it is possible to use fine particles of a resin whose molecular structure contains an isocyanate group masked with a blocking agent.

The fine particles of resin can be made from materials such as urethane, vinyl-acetate, acrylic, styrene-acrylic, and polyester resins. At least one of these can be used.

The average particle diameter of the fine particles of resin is preferably 30 nm or more and 300 nm or less, more preferably 40 nm or more and 100 nm or less. When the average particle diameter falls within these ranges, the resin emulsion's dispersion in the treatment liquid and fixation on the fabric are improved. As used herein, the term "average particle diameter" refers to the volume-based particle size distribution (50%) unless noted otherwise. An average particle diameter can be measured by the dynamic light scattering and laser diffraction methods set forth in JIS Z8825. Specifically, a particle size analyzer can be used that works on the principle of dynamic light scattering (e.g., Nikkiso "Microtrac UPA").

Such a resin emulsion may be commercially available one. Examples of commercially available urethane resin emulsions include SUPERFLEX® 150, 420, 460, 470, 500, 610, 700, 800, 870, 6E-2000, E-2500, E-4000, and R-5000 (DKS), ADEKA BONTIGHTER® HUX-290K, 380, 822, and 830 (trade names, Adeka), TAKELAC® W-6020, 6021, 6061, 605, 635, and WS-6021 (trade names, Mitsui Chemicals Polyurethanes), PERMARIN® UA-150 (trade name, Sanyo Chemical Industries), Sancure® 2710 (trade name, Lubrizol Japan), and NeoRez® R-940, 9637, and 9660 (trade names, Kusumoto Chemicals).

Examples of commercially available vinyl-acetate resin emulsions include VINYBLAN® 1245L (trade name, Nissin Chemical Industry), Polysol® SH-502, AD-2, 10, 13, 17, 70, and 96 (trade names, Showa Denko), and SEIKA-DYNE® 1900 W (trade name, Dainichiseika Color & Chemicals Mfg.).

Examples of commercially available acrylic resin emulsions include VONCOAT® AN-402, R-3310, R-3360, and 4001 (trade names, DIC), Polysol® AM-710, 920, 2300, AP-4735, AT-860, and PSASE-4210E (trade names, Showa Denko), SAIVINOL® SK-200 (Saiden Chemical Industry), AE-120A (trade name, JSR), VINYBLAN® 2650, 2680, 2682, 2684, 2886, and 5202, and NK Binder R-5HN (trade name, Shin-Nakamura Chemical).

Examples of commercially available styrene-acrylic resin emulsions include MICROGEL® E-1002 and 5002 (trade names, Nippon Paint), VONCOAT® 5454 (trade name, DIC), Polysol® AP-7020 (trade name, Showa Denko), SAE1014 (trade name, Zeon), AE373D (trade name, Emulsion Technology), Joncryl® 390, 450, 511, 631, 632, 711, 734, 741, 775, 780, 790, 840, 852, 1535, 7001, 7100, 7600, 7610, 7640, 7641, 74J, 352D, 352J, 537J, 538J, HRC-1645J, PDX-7145, and 7630A (trade names, BASF), and Mowinyl® 966A and 7320 (The Nippon Synthetic Chemical Industry).

Examples of commercially available polyester resin emulsions include Elitel® KA-50715, KT-8701, 8803, 8904, 9204, and 0507 (trade names, UNITIKA) and HYTEC SN-2002 (trade name, TOHO Chemical Industry).

Among these resin emulsions, nonionic and cationic ones are particularly preferred because they are unlikely to react with the cationic polymer.

The amount of fine particles of resin (amount of resin emulsion on a solid basis), if contained in the treatment liquid, is preferably 1% by mass or more and 20% by mass or less, more preferably 1.5% by mass or more and 15% by mass or less, even more preferably 2% by mass or more and 10% by mass or less, of the total mass of the treatment liquid. By setting the amount of resin emulsion on a solid basis within these ranges, it can be ensured that the treatment liquid is not too viscous, and the wash and abrasion resistance, for example, of the printed fabric can be improved.

Surfactant

The treatment liquid may further contain a surfactant. Surfactants help the treatment liquid permeate into the polyester fabric by reducing the surface tension of the liquid. Surfactants that can be used include nonionic, anionic, cationic, and amphoteric surfactants, at least one of which can be used.

The amount of the surfactant, if contained in the treatment liquid, is preferably 0.3% by mass or less of the total mass of the treatment liquid, more preferably 0.25% by mass or less, even more preferably 0.2% by mass or less. Setting the surfactant content within these ranges helps the attached treatment liquid stay on the surface of the polyester fabric by preventing the surface tension of the treatment liquid from being too low, thereby helping the treatment liquid play its functions. Moreover, the amount of the surfactant, if contained in the treatment liquid, is preferably 0.01% by mass or more of the total mass of the treatment liquid, more preferably 0.05% by mass or more, even more preferably 0.1% by mass or more. By setting such an amount of surfactant, the wettability of the attached treatment liquid on the polyester fabric is improved.

Examples of nonionic surfactants that can be used include acetylene-glycol, fluorinated, and silicone surfactants. These surfactants improve the wettability of the treatment liquid on the fabric in a relatively small quantity.

Examples of acetylene-glycol surfactants include, but are not limited to, 2,4,7,9-tetramethyl-5-decin-4,7-diol and alkylene oxide adducts thereof, 2,4-dimethyl-5-decin-4-ol and alkylene oxide adducts thereof, and alkylene oxide adducts of compounds such as 3,6-dimethyl-4-octyn-3,6-diol, 3,5-dimethyl-1-hexyn-3-ol, and 2,4-dimethyl-5-hexyn-3-ol.

Commercial products of such acetylene-glycol surfactants may also be used. Examples include Surfynol® 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (trade names, Air Products and Chemicals, Inc.), OLFINE® B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (trade names, Nissin Chemical Industry), and ACETYLENOL® E00, E00P, E40, and E100 (trade names, Kawaken Fine Chemicals).

For fluorinated surfactants, commercially available ones can be used. Examples include MEGAFACE® F-479 (trade name, DIC) and BYK-340 (trade name, BYK).

Silicone surfactants that can be used include, but are not limited to, polysiloxane compounds. Examples of polysiloxane compounds include, but are not limited to, polyether-modified organosiloxanes. Examples of commercially available polyether-modified organosiloxanes include BYK-302, 306, 307, 333, 341, 345, 346, 347, and 348 (trade names, BYK) and KF-351A, 352A, 353, 354L, 355A, 615A, 945, 640, 642, 643, 6020, 6011, 6012, 6015, 6017, and X-22-4515 (trade names, Shin-Etsu Chemical).

For anionic surfactants, examples include higher fatty acid salts, soaps, α-sulfofatty acid methyl esters, alkylbenzenesulfonates, alkyl sulfates, alkylether sulfates, monoalkyl phosphates, α-olefin sulfonates, alkylnaphthalenesulfonates, naphthalenesulfonate, alkanesulfonates, polyoxyethylene alkylether sulfates, sulfosuccinate, and polyoxyalkylene glycol alkylether phosphates.

For cationic surfactants, examples include quaternary ammonium salts, such as alkyltrimethylammonium salts, dialkyldimethylammonium salts, and alkyldimethylbenzylammonium salts, and amine salts, such as hydrochlorides of N-methyl bishydroxyethylamine fatty acids. The compounds mentioned hereinabove as examples of cationic compounds may also be used.

For amphoteric surfactants, examples include, but are not limited to, amino acid compounds such as salts of alkylaminofatty acids.

One of these surfactants may be used alone, or two or more may be used in combination. Among these, surfactants having an HLB (Hydrophilic-Lipophilic Balance) of 13 or more are preferred. By adding such a surfactant, the permeation of the attached treatment liquid into the polyester fabric and wetting and spread over the fabric can be adjusted.

Other Components

The treatment liquid may optionally contain additives, such as a pH-adjusting agent, a preservative, an antimold, an antioxidant, and/or a chelating agent, and organic solvent.

For pH-adjusting agents, examples include, but are not limited to, organic and inorganic bases. Some examples of organic bases are alkanolamines, such as triethanolamine, diethanolamine, monoethanolamine, and tri-iso-propanolamine. Examples of inorganic bases that can be used include strong bases that are hydroxides of alkali and alkaline earth metals, such as lithium hydroxide, potassium hydroxide, and calcium hydroxide.

For preservatives and antimolds, examples include sodium benzoate, sodium pentachlorophenate, sodium 2-pyridinethiol-1-oxide, sodium sorbate, sodium dehydroacetate, and 1,2-dibenzisothiazolin-3-one (Lonza's trade names of PROXEL CRL, PROXEL BDN, PROXEL GXL, PROXEL XL-2, and PROXEL TN). Adding a preservative and/or an antimold to the treatment liquid will limit bacterial and fungal growth in the treatment liquid.

Organic solvent may be added to adjust characteristics of the treatment liquid such as physical properties, for example viscosity and surface tension, and quickness to dry. When organic solvent is added, those that can be used for the pigment ink, which will be described hereinafter, can be employed.

Preparation of the Treatment Liquid

The treatment liquid can be prepared by mixing the components discussed above in any order, optionally with removal of impurities, contaminants, and other unnecessary substances, for example by filtration. A method for mixing the components is to add the ingredients (components) one by one to a container equipped with a stirrer, such as a mechanical or magnetic stirrer, and then stir and mix the ingredients. The method of filtration can be, for example, centrifugal filtration or passing the mixture through a filter.

Physical Properties of the Treatment Liquid

The physical properties of the treatment liquid are adjusted as desired, for example by changing the kind of polyester fabric and/or the method for attachment to the polyester fabric (method of application). The method of application of the treatment liquid will be described hereinafter.

The viscosity of the treatment liquid at 20° C. is not critical, but preferably is 1.5 mPa·s (millipascal-seconds) or more and 100 mPa·s or less, more preferably 1.5 mPa·s or more and 50 mPa·s or less, even more preferably 1.5 mPa·s or more and 20 mPa·s or less. By setting the viscosity of the treatment liquid within these ranges, the ease of coating with the treatment liquid attached to the polyester fabric, such as spreadability of the liquid, can be improved.

When the treatment liquid is applied by ink jetting, its viscosity at 20° C. is preferably 1.5 mPa·s or more and 15 mPa·s or less, more preferably 1.5 mPa·s or more and 5 mPa·s or less, even more preferably 1.5 mPa·s or more and 3.6 mPa·s or less. By setting the viscosity within these ranges, the ejection of the treatment liquid from the ink jet head in the ink jetting process can be stabilized, and the time required to attach the treatment liquid can be shortened.

The viscosity of the treatment liquid can be measured using, for example, MCR-300 rheometer (Physica), specifically by increasing the shear rate from 10 to 1000 and reading the viscosity at a shear rate of 200 with the temperature of the treatment liquid controlled to 20° C.

The surface tension of the treatment liquid at 25° C. is preferably, for example, 30 mN/m or more and 60 mN/m or less, more preferably 35 mN/m or more and 50 mN/m or less. By setting the surface tension of the treatment liquid at 25° C., the wettability of the attached treatment liquid on the polyester fabric can be improved. Such a setting also helps the attached treatment liquid stay on the surface of the polyester fabric.

The surface tension of the treatment liquid is measured using, for example, using CBVP-Z automated surface tensiometer (Kyowa Interface Science), specifically by wetting a platinum plate with the treatment liquid and measuring the surface tension at 25° C.

Pigment Ink

The following describes the pigment ink, which is applied to polyester fabric treated with a treatment liquid according to this embodiment to produce a printed fabric. As noted above, the pigment ink according to this embodiment is an aqueous pigment ink for ink jet textile printing. The following first describes the individual components of a pigment ink according to this embodiment.

Pigment

The pigment ink according to this embodiment contains pigment as a coloring material. By using pigment as a coloring material, operations such as fixation and washing can be made simpler.

The pigment can be either a known organic or inorganic pigment. Examples of organic pigments include azo pigments, such as azo-lake, insoluble azo, condensed azo, and chelate azo pigments; polycyclic pigments, such as phthalocyanine, perylene, perinone, anthraquinone, quinacridone, dioxazine, thioindigo, isoindolinone, isoindoline, quinophthalone, and diketopyrroropyrrole pigments; dye lake pigments, such as basic-dye and acid-dye lakes; and nitro pigments, nitroso pigments, aniline black, and daylight fluorescent pigments. Examples of inorganic pigments include metal oxide pigments, such as titanium dioxide, zinc oxide, and chromium oxide, and carbon black. Luster pigments may also be used, such as pearl pigments and metallic pigments.

Examples of such pigments for use in, for example, black pigment inks include C.I. (Colour Index Generic Name) Pigment Black 1, 7, and 11. For use in ink jet textile printing, the carbon black pigment (C.I. Pigment Black 7) is particularly preferred because it is unlikely to precipitate in water by virtue of its relatively low specific gravity.

For use in color pigment inks, examples of such pigments include C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 138, 153, 155, and 180, C.I. Pigment Red 1, 2, 3, 5, 17, 22, 23, 31, 38, 48:2 (Permanent Red 2B (Ba)), 48:2 (Permanent Red 2B (Ca)), 48:3, 48:4, 49:1, 52:2, 53:1, 57:1, 60:1, 63:1, 63:2, 64:1, 81, 83, 88, 101, 104, 105, 106, 108, 112, 114, 122, 123, 146, 149, 166, 168, 170, 172, 177, 178, 179, 185, 190, 193, 209, and 219, C.I. Pigment Violet 19 and 23, C.I. Pigment Blue 1, 2, 15, 15:1, 15:2, 15:3, 15:4, 15:6, 16, 17:1, 56, 60, and 63, and C.I. Pigment Green 1, 4, 7, 8, 10, 17, 18, and 36. The average particle diameter of the pigment is preferably 5 µm or less, more preferably 0.3 µm or less, even more preferably between 0.01 µm and 0.15 µm. By setting the average particle diameter of the pigment within these ranges, the color appearance of the pigment on the printed fabric can be improved without compromising stable ejection of the pigment ink from an ink jet head.

Capable of improving the color appearance of pigment, the treatment liquid according to this embodiment is preferably used in textile printing with a white pigment ink. Specifically, in a method of textile printing, for example of a color image, on colored polyester fabric, a white pigment ink is applied first to form a primer layer. This aims to improve the color appearance of the printed image by reducing the influence of the color of the fabric (color of the material) on the color image to be printed. That is, by using a treatment liquid according to this embodiment is combination with a white pigment ink, a primer layer is formed with improved masking effect owing to the color appearance of the white pigment, and this primary layer allows an image, for example, to be printed in a desired color regardless of the color of the material.

Examples of white pigments for the white pigment ink include C.I. Pigment White 1 (basic lead carbonate), 4 (zinc oxide), 5 (mixture of zinc sulfide and barium sulfate), (titanium oxide), 6:1 (titanium oxide and other metal oxides), 7 (zinc sulfide), 18 (calcium carbonate), 19 (clay), (mica titanate), 21 (barium sulfate), 22 (gypsum), 26 (magnesium oxide and silicon dioxide), 27 (silicon dioxide), and 28 (anhydrous calcium silicate). Among these, C.I. Pigment White 6 is particularly preferred given its profound tinting strength and masking effect.

The average particle diameter of the white pigment is preferably 100 µm or more and 450 µm or less, more preferably 200 µm or more and 400 µm or less, even more preferably 250 µm or more and 380 µm or less. By setting the average particle diameter of the white pigment within these ranges, the masking of the color of the material for the fabric can be improved without compromising stable ejection of the white pigment ink from an ink jet head.

The average diameter of pigment can be measured in the same way as described hereinabove for fine particles of resin.

The amount of pigment, if used, is not critical, but preferably is, for example, 0.1% by mass or more and 30% by mass or less of the total mass of the pigment ink, more preferably 1% by mass or more and 20% by mass or less, even more preferably 1% by mass or more and 15% by mass or less. By setting the pigment content within these ranges, the ink composition can be prevented from being too viscous and made less likely to clog an ink jet head without compromising the color appearance of the pigment on the printed fabric.

One of these pigments may be used alone, or two or more may be used as a mixture. It is preferred to treat the surface of the pigment or add a dispersant or similar additive to the pigment ink to increase the dispersibility of the pigment in the pigment ink. Surface treatment of pigment refers to the introduction of a hydrophilic group, such as the carboxy or sulfo group, onto the surface of particles of the pigment through physical or chemical treatment. Surface treatment of pigment renders the pigment dispersible in water and other aqueous solvents.

Dispersants for aqueous solvents act by getting adsorbed onto the surface of particles of pigment with their intramolecular hydrophobic moiety (hydrophobic group) and orienting their hydrophilic moiety (hydrophilic group) toward the solvent (medium). With this action, dispersants render pigment dispersible in aqueous solvents. Known surfactants and polymers are used as dispersants. Alternatively, the pigment may be made dispersible by coating its particles, for example with a polymer. The coating of particles of the pigment can be accomplished by, for example, precipitation using acid, phase inversion emulsification, or mini-emulsion polymerization.

Water

As noted above, the pigment ink according to this embodiment is an aqueous pigment ink, and water is the primary solvent in the pigment ink according to this embodiment. After the pigment ink is applied, the water evaporates away from the polyester fabric by drying. Forms of water that can be used are the same as listed hereinabove for the treatment liquid. The water content of the pigment ink is, for example, 30% by mass or more and 90% by mass or less, preferably 40% by mass or more and 85% by mass or less, more preferably 50% by mass or more and 80% by mass or less, of the total mass of the pigment ink. By setting the water content within these ranges, it can be ensured that the pigment ink is not too viscous. As used herein, the term "aqueous pigment ink" refers to a pigment ink the water content of which is 30% by mass or more of its total mass.

Organic Solvent

The pigment ink may contain organic solvent. By adding organic solvent, the physical properties, such as viscosity and surface tension, of the pigment ink and behavior after application to the polyester fabric, such as drying and permeation, can be adjusted. Examples of organic solvents that can be used include 2-pyrrolidones, 1,2-alkanediols, polyhydric alcohols, and glycol ethers. One of these can be used alone, or two or more can be used in combination.

2-Pyrrolidones are compounds having the 2-pyrrolidone structure. Examples of 2-pyrrolidones include unsubstituted 2-pyrrolidone and substituted compounds, such as N-methyl-2-pyrrolidone, N-ethyl-2-pyrrolidone, and N-vinyl-2-pyrrolidone. The substituent in the 2-pyrrolidone structure is preferably an organic group, such as a saturated or unsaturated hydrocarbon group containing 1 to 5 carbon atoms. Among these, 2-pyrrolidone is particularly preferred given its pronounced effects on the storage stability of the pigment ink and in preventing aggregate formation in the ink.

For 1,2-alkanediols, examples include 1,2-propanediol, 1,2-butanediol, 1,2-pentanediol, 1,2-hexanediol, and 1,2-octanediol. Excellent at improving the wettability of the ink composition to fabric and thereby helping wet the fabric evenly, 1,2-alkanediols allow an image, for example, to be formed with controlled bleeding of the ink. The amount of 1,2-alkenediol, if contained, is preferably 1% by mass or more and 20% by mass or less of the total mass of the pigment ink.

For polyhydric alcohols, examples include ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5- pentanediol, 2-methyl-1,3-propanediol, 2,2-dimethyl-1,3-propanediol, 2-methyl-2,4-pentanediol, and glycerol.

By adding a polyhydric alcohol to the ink composition, will reduce defects in ejection nozzles of the ink jet head, such as clogging and defective ejection, by limiting the drying and solidification of the ink composition occurring in the nozzles. The amount of polyhydric alcohol, if contained, is preferably 2% by mass or more and 20% by mass or less of the total mass of the pigment ink. Even polyhydric alcohols that are solid at 20° C. deliver the same benefits as those that are organic solvents and therefore can be used in the same way. An example of a polyhydric alcohol that is solid at 20° C. is trimethylolpropane.

For glycol ethers, examples include alkylene glycol monoethers and alkylene glycol diethers.

Examples of alkylene glycol monoethers include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether (butyl triglycol), tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol methyl ethyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

By adding a glycol ether to the pigment ink, the wettability of the pigment ink to the polyester fabric and speed of permeation into the fabric can be adjusted. The amount of glycol ether, if contained, is preferably 0.05% by mass or more and 6% by mass or less of the total mass of the pigment ink.

More than one of these organic solvents may be used as a mixture. In that case, the total amount of organic solvents in the pigment ink is, for example, 0.2% by mass or more and 30% by mass or less, preferably 0.4% by mass or more and 20% by mass or less, more preferably 0.5% by mass or more and 15% by mass or less, even more preferably 0.7% by mass or more and 10% by mass or less, of the total mass of the pigment ink. Setting the total amount of organic solvents within these ranges delivers benefits such as not too high a viscosity of the pigment ink, adjustment of behavior (permeation and wetting/spread over surface) after application to the polyester fabric, and reduced defective ejection from an ink jet head.

Surfactant

The pigment ink may contain a surfactant. Surfactants help the pigment permeate into the polyester fabric by reducing the surface tension of the pigment ink. Surfactants that can be used include nonionic, anionic, cationic, and amphoteric surfactants, at least one of which can be used. Examples of surfactants that can be used are the same as listed hereinabove for the treatment liquid.

The amount of surfactant, if contained in the pigment ink, is, for example, 0.01% by mass or more and 3% by mass or less of the total mass of the pigment ink, preferably 0.05% by mass or more and 2% by mass or less, more preferably 0.1% by mass or more and 1% by mass or less, even more preferably 0.2% by mass or more and 0.5% by mass or less. By setting the surfactant content within these ranges, stable ejection from an ink jet head can be ensured by preventing foaming. Furthermore, such a setting helps the treatment liquid plays its functions, such as induction of aggregation, by facilitating contact between the pigment ink and components of the treatment liquid attached to the polyester fabric.

Chelating Agent

The pigment ink may contain a chelating agent. Chelating agents trap metal ions and similar chemical species, which means that by adding a chelating agent to the pigment ink, the emergence of contaminants derived from metal ions can be reduced as a result of the chelating agent trapping metal ions contained as impurities in the pigment ink or coming from materials that the pigment ink comes into contact with. Examples of chelating agents include ethylenediaminetetraacetates (EDTA), nitrilotriacetates of ethylene diamine, hexametaphosphates, pyrophosphates, and metaphosphates.

pH-Adjusting Agent

The pigment ink may contain a pH-adjusting agent. Examples of pH-adjusting agents that may be used include, but are not limited to, organic and inorganic bases. It is preferred to adjust the pH of the pigment to 7.5 or more and 10.5 or less using such a pH-adjusting agent. Setting the pH of the pigment ink within this range will help, in use with an ink jet textile printing device incorporating an ink jet head for example, limit the corrosion of components of the device such as an ink-repellent coating.

Some examples of organic bases are alkanolamines, such as triethanolamine, diethanolamine, monoethanolamine, and tri-iso-propanolamine. To adjust the pH of the pigment ink to the above range with such an organic base, the base needs to be added in a relatively large quantity. Specifically, for example, its quantity is approximately 0.1% by mass or more and 3% by mass or less of the total mass of the pigment ink.

Examples of inorganic bases that can be used include strong bases that are hydroxides of alkali and alkaline earth metals, such as lithium hydroxide, potassium hydroxide, and calcium hydroxide. To make the pH of the pigment ink fall within the above range with such an inorganic base, the quantity of the base can be, for example, approximately 0.03% by mass or more and 0.15% by mass or less of the total mass of the pigment ink. As shown by this, inorganic bases are effective in small quantities compared with organic ones. Because of this and for other reasons, such as being odorless unlike organic bases, inorganic bases are more preferred than organic ones.

Resin

The pigment ink may contain resin as a binder. By adding resin, the wash and abrasion resistance of the printed fabric can be further improved, and the fuzzing of the polyester fabric can be controlled. Examples of resins that can be used are the same as listed hereinabove for the treatment liquid. Not only resin emulsions but also water-soluble polymers may be used. Some examples of water-soluble polymers are those listed hereinabove for the specified compound(s) in the treatment liquid, but other water-soluble polymers may also be used.

The resin content is preferably 2% by mass or more and 25% by mass or less, on a solid basis, of the total mass of the pigment ink, more preferably 4% by mass or more and 15% by mass or less, even more preferably 5% by mass or more and 11% by mass or less. By setting the percentage of resin within these ranges, the wash and abrasion resistance of the printed fabric can be further improved while reducing the clogging of nozzles of the ink jet head.

Other Components

The pigment ink may optionally contain additives, such as an antioxidant, a preservative, and an antimold. Examples of preservatives and antimolds that can be used are the same as listed for the treatment liquid.

Preparation of the Pigment Ink

A pigment ink according to this embodiment can be prepared by mixing the components discussed above in any order, optionally with removal of impurities, contaminants, and other unnecessary substances, for example by filtration. A method for mixing the components is to add the ingredients (components) one by one to a container equipped with a stirrer, such as a mechanical or magnetic stirrer, and then stir and mix the ingredients. The method of filtration can be, for example, centrifugal filtration or passing the mixture through a filter.

Physical Properties of the Pigment Ink

The viscosity of the pigment ink is preferably 2 mPa·s or more and 15 mPa·s or less at 20° C., more preferably 2 mPa·s or more and 5 mPa·s or less, even more preferably 2 mPa·s or more and 3.6 mPa·s or less. By setting the viscosity of the pigment ink within these ranges, it can be ensured that the pigment ink is ejected stably and in an adequate quantity from an ink jet head. When the viscosity is out of these ranges, optimizing the ejection conditions or the type of ink jet head from which the pigment ink is ejected can help ensure stable ejection of the pigment ink. For example, under optimized temperature conditions, ejection can be stable up to a viscosity of 22 mPa·s. The viscosity of the pigment ink can be measured in the same way as described hereinabove for the treatment liquid.

The surface tension of the pigment ink at 25° C. is preferably, for example, 10 mN/m or more and 40 mN/m or less, more preferably 25 mN/m or more and 40 mN/m or less. Setting the surface tension of the pigment ink at 25° C. within these ranges helps, in the textile printing process, the pigment ink wet the polyester fabric and come into contact with the components of the treatment liquid. The viscosity and surface tension of the pigment ink can be measured in the same way as described hereinabove for the treatment liquid.

Ink Jet Textile Printing Device

Printer

The following describes an ink jet textile printing device according to this embodiment with reference to FIGURE. An ink jet textile printing device is apparatus that performs printing on fabric by ink jetting, i.e., ejecting tiny droplets of an ink composition, and thereby impacting the droplets onto the fabric. FIGURE is a schematic perspective view of an ink jet textile printing device according to an embodiment. This embodiment describes a cartridge-on-carriage printer, which has ink cartridges on a carriage, as an example of an ink jet textile printing device. In FIGURE, the components are not to scale so that they are large enough to be recognized.

The printer 1 according to this embodiment is what is called a serial printer. A serial printer has a carriage that moves in a predetermined direction and an ink jet head carried by the carriage. The head performs printing while moving as the carriage moves.

As illustrated in FIGURE, the printer 1 has components such as an ink jet head 3, a carriage 4, a primary scanning mechanism 5, a platen roller 6, and a control unit (not illustrated) that controls the entire operation of the printer 1. The carriage 4 carries, besides the ink jet head 3, six detachable ink cartridges 7a, 7b, 7c, 7d, 7e, and 7f that contain ink compositions to be fed to the ink jet head 3.

The primary scanning mechanism 5 has a timing belt connected to the carriage 4, a motor 9 that drives the timing belt 8, and a guide shaft 10. The guide shaft 10 extends in the direction of the running of the carriage 4 (the primary scanning direction), supporting the carriage 4. The carriage 4 can be driven by the motor 9 via the timing belt 8 to reciprocate along the guide shaft 10. In this way, the primary scanning mechanism 5 makes the carriage 4 reciprocate in the primary scanning direction.

The platen roller 6 transports the fabric 2 as the substrate for printing in a secondary scanning direction perpendicular to the primary scanning direction (along the length of the fabric 2). The fabric 2 is therefore transported in the secondary scanning direction. Since the carriage 4, carrying the ink jet head 3, can reciprocate in the primary scanning direction, which substantially matches the direction of width of the fabric 2, the ink jet head 3 can run over the fabric 2 in the primary and secondary scanning directions by changing its relative position.

The six ink cartridges 7a, 7b, 7c, 7d, 7e, and 7f are separate ink cartridges. The ink cartridges 7a, 7b, 7c, 7d, 7e, and 7f can contain pigment inks according to this embodiment. In these ink cartridges, pigment inks in colors such as black, cyan, magenta, yellow, white, and orange are contained separately and can be used in any combination. Although six ink cartridges are illustrated in FIGURE, this is not the only possible number of ink cartridges. The ink cartridges 7a, 7b, 7c, 7d, 7e, and 7f each have, in their bottom portion, a feeding port (not illustrated) through which the pigment ink is fed to the ink jet head 3.

The ink jet head 3 has a nozzle surface (not illustrated) facing the fabric 2. On the nozzle plate, nozzle rows (not illustrated) are arranged each corresponding to a color of pigment ink, each nozzle row including multiple nozzles (not illustrated). Each color of pigment ink is fed from its ink cartridge to the ink jet head 3 and then, by the action of an actuator (not illustrated) fitted in the ink jet head 3, ejected from the nozzles as droplets. The ejected droplets of pigment inks land on the fabric 2, forming an image, text, a pattern, an expression of colors, or others on a printing region on the fabric 2.

The ink jet head 3 uses piezoelectric elements as the actuators (drivers), but this is not the only possible mode of driving. For example, the drivers may be electromechanical transducers, which displace a diaphragm as an actuator using electrostatic attraction, or electrothermal transducers, which eject droplets of pigment ink using bubbles generated by heating.

It should be understood that the cartridge-on-carriage printer 1 described in this embodiment is merely an example of an ink jet textile printing device and is not the only possible form. For example, the printing device may be an off-carriage printer, in which ink containers, such as ink cartridges, are not carried by a carriage. Moreover, the ink jet textile printing device used in this embodiment does not need to be a serial printer as described above but may be a line-head printer, in which the ink jet head has a width greater than or equal to that of the fabric 2 and performs printing in a fixed place.

Fabric

The fabric 2 according to this embodiment can be, for example, a piece of fabric, an item of clothing, or any other fabric article. Fabric types that can be used include woven fabric, knitted fabric, and nonwoven fabric. Clothing and other fabric articles that can be used include sewn T-shirts, handkerchiefs, scarfs, towels, totes, fabric bags, furniture such as curtains, bedsheets, bed covers, and wallpapers, and cut and uncut materials for sewing. These can be in the form of, for example, a long roll, a prescribed size of fabric, or a finished product.

The fabric 2 is polyester fabric, containing polyester. Polyester fabric refers to fabric that contains polyester fiber and that is made solely of polyester fiber or of mixed fiber containing polyester fiber and any other fiber(s). Examples of fibers mixed with polyester fiber include natural fibers, such as cotton, silk, flax, and wool, and synthetic fibers, such as polypropylene, acetate, triacetate, polyamide, polyurethane, and polylactic acid.

The grammage of the fabric 2 is 1.0 oz (ounce) or more and 10.0 oz or less, preferably 2.0 oz or more and 9.0 oz or less, more preferably 3.0 oz or more and 8.0 oz or less, even more preferably 4.0 oz or more and 7.0 oz or less. The treatment liquid according to this embodiment improves color appearance on fabric 2 having such a grammage by leaving its components, such as a cationic compound, on the front side of the fabric. The treatment liquid according to this embodiment can be used with multiple fabrics with different grammages.

Preferably, the fabric 2 is colored polyester fabric. By virtue of the improved color appearance of pigment provided by the treatment liquid according to this embodiment, the color of the material is masked, and therefore the interference of the color of the material is reduced. That is, the treatment liquid according to this embodiment is suitable for use with colored polyester fabric. By using colored fabrics, moreover, a manufacturer can provide printed fabrics (products) that meet its customers' tastes.

Examples of dyes for prior coloring of the fabric 2 include water-soluble ones, such as acid dyes and basic dyes, disperse dyes, which are used in combination with a dispersant (surfactant), and reactive dyes. Given that the fabric 2 contains polyester fiber, it is preferred to use a disperse dye suitable for dyeing polyester fiber. The disperse dye suitable for dyeing polyester fiber is preferably a compound that does not easily sublime during heating (S4), which will be described hereinafter. The disperse dye is preferably used with a dispersant. The dispersant can be known one, such as a surfactant.

As for the method for dyeing the fabric 2, a known method may be used according to conditions such as the material and form of the fabric 2.

Ink Jet Textile Printing Method

The following describes an ink jet textile printing method according to this embodiment. In the ink jet textile printing method according to this embodiment, ink jet pigment textile printing is performed by applying droplets of pigment inks to fabric 2 by ejecting the droplets, for example to form an image, by ink jetting using a printer 1 as described above (see FIGURE).

An ink jet textile printing method according to this embodiment includes attaching a treatment liquid according to this embodiment to fabric 2 (S1) and, after S1, heating at a temperature of 140° C. or less (S2). Then, a white pigment ink is attached by ink jetting to the region to which the treatment liquid has been attached (S3).

In S1, a treatment liquid according to this embodiment is attached to at least a region of the fabric 2. Examples of coating techniques that can be used to attach the treatment liquid to the fabric 2 include dipping the fabric 2 into the treatment liquid (dip coating), attaching the treatment liquid using a brush, roller, spatula, or roll coater (roller coating), ejecting the treatment liquid using a sprayer or any similar tool (spray coating), and ejecting the treatment liquid by ink jetting (ink jet coating). Any of these coating techniques may be used according to conditions such as the form of the fabric 2 and the physical properties of the treatment liquid, and more than one method may be used in combination. It is preferred to use dip coating, roller coating, spray coating, or any similar technique so that the treatment liquid can be attached quickly in a simple setup.

In S1, it is preferred that the amount of treatment liquid attached to the fabric 2 per unit area of fabric 2 be 8.0 $mg/cm^2$ or more and 160.3 $mg/cm^2$ or less, more preferably 16.0 $mg/cm^2$ or more and 128.3 $mg/cm^2$ or less, even more preferably 19.2 $mg/cm^2$ or more and 80.2 $mg/cm^2$ or less. By setting the amount of treatment liquid attached to 19.2 $mg/cm^2$ or more, color unevenness and other defects that can occur during the subsequent application of pigment inks can be made less frequent by ensuring relatively even attachment of the treatment liquid to the fabric 2. Moreover, by setting the amount of treatment liquid attached to 80.2 $mg/cm^2$ or less, bleeding during the application of pigment inks can be reduced.

In S1, it is preferred that the amount of cationic compound, a component of the treatment liquid, attached to unit area of the fabric 2 be 7.5 $\mu mol/cm^2$ or more and 40 $\mu mol/cm^2$ or less, more preferably 12 $\mu mol/cm^2$ or more and 30 $\mu mol/cm^2$ or less. Setting the amount of cationic compound to 10 $\mu mol/cm^2$ or more will further improve the color appearance of the pigments after the subsequent application of pigment inks. Moreover, setting the amount of cationic compound to 40 $\mu mol/cm^2$ or less will improve the wash resistance of the printed fabric.

Once attached to the fabric 2 in S1, the treatment liquid according to this embodiment leaves its components on the front side of the fabric 2 by virtue of containing a specified compound(s).

In S2, the treatment liquid attached to the fabric 2 is dried by heating. Drying by heating (heat drying) is preferred over air drying as it shortens the time required for dryness. Examples of heating methods that can be used include, but are not limited to, heat pressing, steaming under atmospheric pressure, steaming under high pressure, and thermo-fixation. Any kind of heat source can be used, but an example is an infrared lamp.

The heating temperature is not critical, but preferably is, for example, 140° C. or less, more preferably 130° C. or less. Even when the fabric 2 has been colored with a disperse dye (sublimation dye), such a setting will limit the sublimation of the disperse dye caused by heat drying, thereby limiting the associated discoloration of the material of the fabric 2. There is no lower limit to the heating temperature because the only requirement is that water and any other solvent in the treatment liquid evaporate away, but preferably, the heating temperature is approximately 100° C. or more. It is preferred that the heating temperature in S2 be close to that in S4, which will be described hereinafter, because this makes the drying process simple. The heating temperature in S2 refers to the surface temperature of the treatment liquid attached to the fabric 2 and can be measured using, for example, IT2-80 non-contact thermometer (trade name, Keyence). The duration of heating is not critical, but can be, for example, 30 seconds or more and 20 minutes or less.

In S3, droplets of a white pigment ink ejected from an ink jet head 3 (see FIGURE) are applied, in the way described above, to the region of the fabric 2 treated with the treatment liquid. This makes the components of the white pigment ink, such as white pigment, react with the cationic compound and aggregate on the front side of the fabric 2. As a result, the white pigment is unlikely to sink into the fabric 2, and its color comes out better than without the specified compound(s).

In S3, it is preferred that the amount of white pigment ink attached to the fabric 2 be 500 $g/m^2$ or less, more preferably 400 $g/m^2$ or less, even more preferably 300 $g/m^2$ or less. This makes the strike-through of the white pigment ink less frequent by reducing the amount of it attached, without compromising the color appearance of the white pigment. It is preferred that the amount of white pigment ink attached to the fabric 2 be 240 $g/m^2$ or more, more preferably 260 $g/m^2$ or more, even more preferably 280 $g/m^2$ or more. This ensures that the improved color appearance of the white pigment counters the influence of the color of the material of the fabric 2 even when the fabric 2 has been colored.

S3 may be followed by heating the white pigment ink attached to the fabric 2 (S4). Examples of heating methods that can be used in S4 are the same as listed hereinabove for S2. Preferably, the heating method is the same as that used in the heat drying in S2.

The heating temperature in S4 is preferably 140° C. or less, more preferably 130° C. or less. Even when the fabric 2 has been colored with a disperse dye (sublimation dye), such a setting will limit the sublimation of the disperse dye caused by heat drying, thereby limiting the loss of color appearance caused by sublimed dye adhering to and coloring the printed surface. Such a setting will also limit the discoloration of the material of the fabric 2.

S4 may be followed by washing the printed fabric 2 with water and drying the washed fabric 2 (S5). The washing with water may optionally include soaping, a treatment in which any fractions of the white pigment ink and other components not fixed on the fabric 2 are washed away, for example using a hot soap solution. Through these operations, a printed fabric is produced.

Overall, the treatment liquid and ink jet textile printing method according to this embodiment provide the following advantages.

The treatment liquid according to this embodiment, in printing on dark-colored polyester fabric (fabric 2) using ink jet pigment textile printing, reduces the strike-through and improves the color appearance of pigment. Specifically, polyvinylpyrrolidones, polyethylene oxides, carboxymethyl celluloses, hydroxyethyl celluloses, and polyvinyl alcohols are compounds whose polymer chains easily tangle with fiber of fabric 2. These specified compounds, moreover, generally give a treatment liquid a relatively high viscosity when contained therein. By virtue of these, the treatment liquid does not easily sink into pores in the fabric 2, its pore-sealing effect is enhanced, and the components of the treatment liquid can be held more easily on the surface of the fabric 2 than in the related art. The improved fixation of the treatment liquid on the fabric 2 leads to fiber of the fabric 2 being coated with the treatment liquid. As a result, in the process of ink jet pigment textile printing, the treatment liquid functions more fully, for example at sealing of fiber pores and induction of aggregation, than those in the related art. Furthermore, the coating of hydrophobic polyester with the treatment liquid provides improved compatibility between the fabric 2 and pigment ink by making the specified compound mediate between the polyester and pigment ink. Overall, the treatment liquid composition reduces strike-through by helping hold the pigment and other components of the ink on the front side of the fabric 2, and improves color appearance better than those in the related art even on dark-colored material by virtue of the action of the cationic compound helping the pigment aggregate.

Relatively highly soluble in water, polyvinylpyrrolidones, polyethylene oxides, carboxymethyl celluloses, hydroxyethyl celluloses, and polyvinyl alcohols can be used with a higher molecular weight than compounds less soluble in water. Since the molecular chains of a compound become longer with increasing molecular weight, compounds with higher molecular weights more easily tangle with fiber of the fabric 2 and improve the fixation of the treatment liquid on the fabric 2 better than those with lower molecular weights.

The treatment liquid also allows a primer layer better in color appearance than in the related art to be formed on the fabric 2 using a white pigment ink. Such a primer layer allows images, patterns, and the like to be formed in a desired color tone thereon. Moreover, the improved color appearance of the white pigment leads to reduced strike-through of the white pigment because the amount of white pigment ink that needs to be applied is smaller.

The treatment liquid is suitable for use with colored fabric 2. By using colored fabrics 2, a manufacturer can provide printed fabrics (products) that meet its customers' tastes.

Since the at least one cationic compound is at least one of multivalent metal salts and cationic polymers, the color appearance of the pigment is further improved as a result of promoted aggregation of the pigment and other components of the ink.

Since the amount of the specified compound(s) is 0.5% by mass or more and 6.0% by mass or less of the total mass of the treatment liquid, the pore-sealing effect of the treatment liquid is viable even on a fabric 2 with relatively large pores, and color appearance is additionally improved. This setting also helps maintain the texture of the fabric 2 by limiting the hardening of the fabric 2 after the attachment of the treatment liquid.

Since the treatment liquid further contains fine particles of resin, its pore-sealing effect on fabric 2 is enhanced. Adding fine particles of resin also provides an additional improvement in the fixation of the components of the treatment liquid and the pigment, thereby improving the abrasion and wash resistance of the printed fabric produced by the ink jet pigment textile printing process.

The ink jet textile printing method according to this embodiment provides a method by which ink jet textile printing can be performed on fabric 2 with less frequent strike-through and improved color appearance. Moreover, the use of ink jet textile printing makes this method easily applicable to high-mix low-volume production, for reasons such as not requiring a printing plate that is essential in analog textile printing, and allows for high-resolution printing, for example of images.

Since S1 is followed by heating at a temperature of 140° C. or less (S2), even when the polyester fabric (material) has been colored with a disperse dye (sublimation dye), the treatment liquid can be dried with less sublimation of the disperse dye caused by heating and with less discoloration of the material. Even with heating at relatively low temperatures of 140° C. or less, the color appearance of the pigment is improved.

By virtue of including attaching a white pigment ink by ink jetting to the region treated with the treatment liquid (S3), the method provides an ink jet textile printing method for forming a white primer layer better in color appearance than in the related art and then an image or pattern, for example, in a desired color tone on the primer layer.

Since the amount of white ink pigment attached to the fabric 2 in S3 is 500 g/m² or less, the strike-through of the white pigment is infrequent by virtue of the reduced amount of white pigment ink attached, with the color appearance of the white pigment not compromised.

The following describes the advantages of this embodiment in further detail by providing Examples and Comparative Examples in which treatment liquids according to this embodiment were tested for color appearance, strike-through, abrasion resistance, pretreatment spots, texture, and storage stability.

Preparation of the Treatment Liquids

The formula of the treatment liquids of Examples 1 to 24 and Comparative Examples 1 to 7 are presented in Tables 1 and 2. In Tables 1 and 2, the values are in % by mass. For the cationic polymer and resin emulsion, the values are the percentages of the active ingredient (on a solid basis). The amount of ion-exchanged water was adjusted to make the total mass of the treatment liquid 100.0% by mass. The cells displaying "-" instead of a number mean that the treatment liquid did not contain that component.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Multivalent metal salt | Calcium Chloride dihydrate | 12.0 | 12.0 | 12.0 | 12.0 | 12.0 | — | 12.0 | 12.0 | 12.0 |
| Cationic polymer | PAA-HCL-01 | — | — | — | — | — | 12.0 | — | — | — |
| Polyethylene oxide | Alkox E-30 | 2.0 | 2.0 | 2.0 | — | — | 2.0 | 0.4 | 4.5 | 2.0 |
| Polyvinylpyrrolidone | PITZCOL K-30L | — | — | — | — | — | — | — | — | — |
| Carboxymethyl cellulose | CMC Daicel 1120 | — | — | — | 2.0 | — | — | — | — | — |
| Hydroxyethyl cellulose | HEC Daicel SP200 | — | — | — | — | 2.0 | — | — | — | — |
| Fine particles of resin | VINYBLAN 1245L | 2.0 | 1.0 | — | — | 2.0 | 2.0 | 2.0 | 2.0 | 2.0 |
| Surfactant | OLFINE E1010 | 0.1 | 0.1 | 0.1 | 0.1 | 0.1 | 0.1 | 0.1 | 0.1 | 0.1 |
| Water | Ion-exchanged water | Balance | Balance | Balance | Balance | Balance | Balance | Balance | Balance | Balance |
|  | Total | 100.0 | 100.0 | 100.0 | 100.0 | 100.0 | 100.0 | 100.0 | 100.0 | 100.0 |
| Printing conditions | Treatment liquid heating temperature [° C.] | 130 | 130 | 130 | 130 | 130 | 130 | 130 | 130 | 170 |
|  | Amount of ink attached [g/m²] | 300 | 300 | 300 | 300 | 300 | 300 | 300 | 300 | 300 |
|  | Ink heating temperature [° C.] | 130 | 130 | 130 | 130 | 130 | 130 | 130 | 130 | 130 |

|  |  | Example 10 | Example 11 | Example 12 | Example 13 | Example 14 | Example 15 | Example 16 |
|---|---|---|---|---|---|---|---|---|
| Multivalent metal salt | Calcium Chloride dihydrate | 12.0 | 12.0 | 12.0 | 12.0 | 12.0 | 12.0 | — |
| Cationic polymer | PAA-HCL-01 | — | — | — | — | — | — | 12.0 |
| Polyethylene oxide | Alkox E-30 | 2.0 | 2.0 | 2.0 | — | — | — | — |
| Polyvinylpyrrolidone | PITZCOL K-30L | — | — | — | 2.0 | 2.0 | 2.0 | 2.0 |
| Carboxymethyl cellulose | CMC Daicel 1120 | — | — | — | — | — | — | — |
| Hydroxyethyl cellulose | HEC Daicel SP200 | — | — | — | — | — | — | — |
| Fine particles of resin | VINYBLAN 1245L | 2.0 | 2.0 | 2.0 | 2.0 | 1.0 | — | 2.0 |
| Surfactant | OLFINE E1010 | 0.1 | 0.1 | 0.1 | 0.1 | 0.1 | 0.1 | 0.1 |
| Water | Ion-exchanged water | Balance | Balance | Balance | Balance | Balance | Balance | Balance |
|  | Total | 100.0 | 100.0 | 100.0 | 100.0 | 100.0 | 100.0 | 100.0 |
| Printing conditions | Treatment liquid heating temperature [° C.] | 130 | 130 | 130 | 130 | 130 | 130 | 130 |
|  | Amount of ink attached [g/m²] | 300 | 500 | 230 | 300 | 300 | 300 | 300 |
|  | Ink heating temperature [° C.] | 170 | 130 | 130 | 130 | 130 | 130 | 130 |

TABLE 2

|  |  | Example 17 | Example 18 | Example 19 | Example 20 | Example 21 | Example 22 | Example 23 | Example 24 |
|---|---|---|---|---|---|---|---|---|---|
| Multivalent metal salt | Calcium Chloride dihydrate | 12.0 | 12.0 | 12.0 | 12.0 | 12.0 | 12.0 | 7.0 | 20.0 |
| Cationic polymer | PAA-HCL-01 | — | — | — | — | — | — | — | — |
| Polyethylene oxide | Alkox E-30 | — | — | — | — | — | — | — | — |
| Polyvinylpyrrolidone | PITZCOL K-30L | 0.4 | 4.5 | 2.0 | 2.0 | 2.0 | 2.0 | 2.0 | 2.0 |

TABLE 2-continued

| | | | | | | | | | |
|---|---|---|---|---|---|---|---|---|---|
| Carboxymethyl cellulose | CMC Daicel 1120 | — | — | — | — | — | — | — | — |
| Hydroxyethyl cellulose | HEC Daicel SP200 | — | — | — | — | — | — | — | — |
| Fine particles of resin | VINYBLAN 1245L | 2.0 | 2.0 | 2.0 | 2.0 | 2.0 | 2.0 | 2.0 | 2.0 |
| Surfactant | OLFINE E1010 | 0.1 | 0.1 | 0.1 | 0.1 | 0.1 | 0.1 | 0.1 | 0.1 |
| Water | Ion-exchanged water | Balance | Balance | Balance | Balance | Balance | Balance | Balance | Balance |
| | Total | 100.0 | 100.0 | 100.0 | 100.0 | 100.0 | 100.0 | 100.0 | 100.0 |
| Printing conditions | Treatment liquid heating temperature [° C.] | 130 | 130 | 170 | 130 | 130 | 130 | 130 | 130 |
| | Amount of ink attached [g/m$^2$] | 300 | 300 | 300 | 300 | 500 | 230 | 300 | 300 |
| | Ink heating temperature [° C.] | 130 | 130 | 130 | 170 | 130 | 130 | 130 | 130 |

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Multivalent metal salt | Calcium Chloride dihydrate | 12.0 | — | 12.0 | 12.0 | 12.0 | — | — |
| Cationic polymer | PAA-HCL-01 | — | 12.0 | 12.0 | 12.0 | — | — | — |
| Polyethylene oxide | Alkox E-30 | — | — | — | — | — | — | — |
| Polyvinylpyrrolidone | PITZCOL K-30L | — | — | — | — | — | 2.0 | 4.5 |
| Carboxymethyl cellulose | CMC Daicel 1120 | — | — | — | — | — | — | — |
| Hydroxyethyl cellulose | HEC Daicel SP200 | — | — | — | — | — | — | — |
| Fine particles of resin | VINYBLAN 1245L | 2.0 | 2.0 | 2.0 | 2.0 | 2.0 | 2.0 | 2.0 |
| Surfactant | OLFINE E1010 | 0.1 | 0.1 | 0.1 | 0.1 | 0.1 | 0.1 | 0.1 |
| Water | Ion-exchanged water | Balance | Balance | Balance | Balance | Balance | Balance | Balance |
| | Total | 100.0 | 100.0 | 100.0 | 100.0 | 100.0 | 100.0 | 100.0 |
| Printing conditions | Treatment liquid heating temperature [° C.] | 130 | 130 | 130 | 170 | 130 | 130 | 130 |
| | Amount of ink attached [g/m$^2$] | 300 | 300 | 300 | 300 | 500 | 300 | 300 |
| | Ink heating temperature [° C.] | 130 | 130 | 130 | 130 | 130 | 130 | 130 |

The treatment liquid of Example 1 contained 12.0% by mass the multivalent metal salt calcium chloride dihydrate (reagent) as a cationic compound, 2.0% by mass the polyethylene oxide Alkox® E-30 (trade name, Meisei Chemical Works) as a specified compound, 2.0% by mass the vinyl-acetate (vinyl acetate-acrylic) resin emulsion VINYBLAN® 1245L (trade name, Nissin Chemical Industry, 40% solids by mass) as a resin emulsion containing fine particles of resin, 0.1% by mass the nonionic (acetylene-glycol) surfactant OLFINE® E1010 (trade name, Nissin Chemical Industry; HLB, 13 to 14) as a surfactant, and ion-exchanged water.

The treatment liquid of Example 2, compared with that of Example 1, contained 1.0% by mass resin emulsion (VINYBLAN 1245L). The treatment liquid of Example 3, compared with that of Example 1, contained no resin emulsion.

The treatment liquid of Example 4, compared with that of Example 1, contained a different specified compound, the carboxymethyl cellulose CMC Daicel® 1120 (trade name, Daicel FineChem) (2.0% by mass).

The treatment liquid of Example 5, compared with that of Example 1, contained a different specified compound, the hydroxyethyl cellulose HEC Daicel® SP200 (trade name, Daicel FineChem) (2.0% by mass).

The treatment liquid of Example 6, compared with that of Example 1, contained a different cationic compound, the cationic polymer PAA-HCL-01 (trade name, Nittobo Medical) (12.0% by mass).

The treatment liquid of Example 7, compared with that of Example 1, contained a reduced amount, 0.4% by mass, of specified compound (Alkox E-30).

The treatment liquid of Example 8, compared with that of Example 1, contained an increased amount, 4.5% by mass, of specified compound (Alkox E-30).

The treatment liquids of Examples 9 to 12 were made to the same formula as that of Example 1. In these Examples, the printing conditions, described hereinafter, were changed from those in Example 1.

The treatment liquid of Example 13, compared with that of Example 1, contained a different specified compound, the polyvinylpyrrolidone PITZCOL® K-30L (trade name, DKS) (2.0% by mass).

The treatment liquid of Example 14, compared with that of Example 13, contained a reduced amount, 1.0% by mass, of resin emulsion (VINYBLAN 1245L). The treatment liquid of Example 15, compared with that of Example 13, contained no resin emulsion.

The treatment liquid of Example 16, compared with that of Example 6, contained a different specified compound, PITZCOL® K-30L (trade name, DKS) (2.0% by mass).

The treatment liquid of Example 17, compared with that of Example 13, but contained a reduced amount, 0.4% by mass, of specified compound (PITZCOL K-30L).

The treatment liquid of Example 18, compared with that of Example 13, but contained an increased amount, 4.5% by mass, of specified compound (PITZCOL K-30L).

The treatment liquids of Examples 19 to 22 were made to the same formula as that of Example 13. In these Examples, the printing conditions, described hereinafter, were changed from those in Example 13.

The treatment liquid of Example 23, compared with that of Example 13, contained a reduced amount, 7.0% by mass, of cationic compound (calcium chloride dihydrate).

The treatment liquid of Example 24, compared with that of Example 13, contained an increased amount, 20.0% by mass, of cationic compound (calcium chloride dihydrate).

The treatment liquid of Comparative Example 1, compared with that of Example 1, contained no specified compound.

The treatment liquid of Comparative Example 2, compared with that of Example 7, contained no specified compound.

The treatment liquid of Comparative Example 3, compared with that of Comparative Example 1, contained another cationic compound, the cationic polymer PAA-HCL-01 (trade name, Nittobo Medical) (12.0% by mass).

The treatment liquid of Comparative Example 4 was made to the same formula as that of Comparative Example 3. In this Comparative Example, the printing conditions, described hereinafter, were changed from those in Comparative Example 3.

The treatment liquid of Comparative Example 5 was made to the same formula as that of Comparative Example 1. In this Comparative Example, the printing conditions, described hereinafter, were changed from those in Comparative Example 1.

The treatment liquid of Comparative Example 6, compared with that of Example 1, did not contain the cationic compound (calcium chloride dihydrate).

The treatment liquid of Comparative Example 7, compared with that of Comparative Example 6, contained an increased amount, 4.5% by mass, of specified compound (PITZCOL K-30L).

Treatment liquids of Examples and Comparative Examples were prepared according to the formula presented in Tables 1 and 2. Specifically, the individual components were put into a container and mixed and stirred for 2 hours using a magnetic stirrer. The resulting mixture was filtered through a 5-µm PTFE (polytetrafluoroethylene) membrane filter. In this way, the treatment liquids of Examples and Comparative Examples (hereinafter also referred to as "the treatment liquids") were obtained.

Preparation of White Pigment Ink

The formula of white pigment ink A, which was used to test textile printing on fabric to which these treatment liquids were attached, is presented in Table 3. The values in the table are in % by mass. The amount of ion-exchanged water was adjusted to make the total mass of white pigment ink A 100.0% by mass.

TABLE 3

|  | A |
| --- | --- |
| White pigment dispersion | 8.0 |
| TAKELAC WS-6021 | 8.0 |
| Glycerol | 6.0 |
| Triethylene glycol | 3.0 |
| Butyl triglycol | 1.0 |
| BYK-348 | 0.3 |
| Ion-exchanged water | Balance |
| Total | 100.0 |

In white pigment ink A, the white pigment was titanium dioxide (C.I. Pigment White 6), and the titanium dioxide slurry NanoTek® Slurry (trade name, C.I. Kasei; 20% solid titanium oxide by mass; average particle diameter, 250 nm) was contained as a white pigment dispersion. Table 3 indicates the amount on a titanium oxide basis (pigment concentration), and the amount of the white pigment dispersion (titanium dioxide slurry) in white pigment ink A was 40% by mass.

The resin was the urethane resin emulsion TAKELAC® WS-6021 (trade name, Mitsui Chemicals Polyurethanes; 30% solids by mass). Table 3 indicates the amount in white pigment ink A on a resin (solid) basis, and the amount of the resin emulsion including the dispersion medium (water) was 26.7% by mass. The silicone surfactant (nonionic surfactant) BYK-348 (trade name, BYK) was also contained. The other components denoted by the name of a compound were commercially available reagents.

In accordance with the formula of white pigment ink A presented in Table 3, the individual components were put into a container and mixed and stirred for 2 hours using a magnetic stirrer, followed by 1-hour dispersion in a bead mill containing 0.3-mm zirconia beads. The resulting dispersion was filtered through a 5-µm PTFE membrane filter. In this way, white pigment ink A was obtained.

Production of Test Fabric

Fabric

As colored polyester fabric, the following T-shirts X were used.

T-shirts X (black): glimmer ACTIVE WEAR 3.5 oz Interlock Dry T-shirts 005, black (TOMS, 100% polyester)

Application of Treatment Liquid

T-shirts X were pretreated (S1) by applying the treatment liquids of Examples and Comparative Examples. The application was done by roller coating. A sponge roller impregnated with the treatment liquid was rolled over the front surface of the cloth in a chest area (on one side) of a T-shirt X left and right three or four times, and then up and down, in the direction substantially perpendicular to the left and right direction, three or four times to make the attachment of the treatment liquid as even as possible. The amount of the treatment liquid attached to each T-shirt X was approximately 20 g per A4 area.

The pretreated T-shirt X was then heat-dried (S2) for 90 seconds using a heat press with a pressing force of 3.0 kN. The heating temperature was 170° C. for Examples 9 and 19 and Comparative Example 4 and 130° C. for the others.

Pigment Textile Printing

Then, a solid image was printed (S3) on the pretreated area of each T-shirt X with white pigment ink A by ink jetting using SC-F200 ink jet printer (trade name, Seiko Epson). The amount of white pigment ink A attached to the T-shirt X was 500 g/m² for Examples 11 and 21 and Comparative Example 5, 230 g/m² for Examples 12 and 22, and 300 g/m² for the others.

The printed T-shirt X was then heat-dried (S4) for 90 seconds using a heat press with a pressing force of 3.0 kN. The heating temperature was 170° C. for Examples 10 and 20 and 130° C. for the others.

Of the printing conditions described above, the heating temperature for the treatment liquid, amount of white pigment ink A attached in the textile printing on the T-shirt X (amount of ink attached), and heating temperature used in S4 (ink heating temperature) are presented in Tables 1 and 2. By the process described above, test T-shirts X of Examples and Comparative Examples were obtained.

Testing

The test T-shirts X, coated respectively with the treatment liquids and then printed, were subjected to the following tests. The results are presented in Table 4.

Color Appearance

The color of the area α printed with white pigment ink A of the T-shirt X was determined as a measure of the color appearance (whiteness) of the white pigment. Specifically, L* was measured using Spectrolino colorimeter (Gretag) and rated against the criteria below. A grade C or better grade means that the advantages of certain aspects of the invention were obtained.
- A: L* is 78 or more.
- B: L* is 75 or more and less than 78.
- C: L* is 72 or more and less than 75.
- D: L* is 69 or more and less than 72.
- E: L* is less than 69.

Strike-Through

The T-shirt X was reversed inside out, and the backside of the cloth of area α was visually observed for any white pigment seeping out, i.e., the degree of strike-through. The degree of strike-through was rated against the criteria below.
- A: No or little seeping out of the white pigment (strike-through) is observed.
- B: A small degrees of seeping out of the white pigment (strike-through) is observed.
- C: The seeping out of the white pigment (strike-through) is significant.

Abrasion Resistance

As a measure of abrasion resistance, a fastness of a test specimen cut out of area α of the T-shirt X was tested as directed in ISO 105-X12 (Textiles—Tests for colour fastness—Colour fastness to rubbing). Specifically, using CrockMaster Type 1 (James Heal), the test specimen was rubbed by ten reciprocations of canequim as crocking cloth with a load of 9 N in the dry mode (with the crocking cloth being dry). The test specimen was then observed for any detachment of the white pigment, and the degree of detachment was rated against the criteria below. For the treatment liquids for which the strike-through grade was C, the abrasion resistance grade is ND (No Data) because abrasion resistance measurement was difficult.
- A: No or little detachment of the white pigment is observed.
- B: A small degree of detachment of the white pigment is observed.
- C: The detachment of the white pigment is significant.

Texture

As a measure of texture, the feel of area α of the T-shirt X when touched with hands was functionally rated against the criteria below.
- A: The cloth feels soft with only negligible stiffness.
- B: The cloth feels somewhat hard (stiff).
- C: The cloth feels significantly stiff.

Pretreatment Spots

Attaching a treatment liquid to colored fabric can cause a difference in appearance, for example in hue, between the treated and untreated areas, called pretreatment spots. As a measure of pretreatment spots, the difference in appearance was determined by visual observation between an area β of the T-shirt X to which the treatment liquid was not attached and an area γ to which the treatment liquid was attached but white pigment ink A was not applied, and rated against the criteria below.
- A: In area γ, little difference in appearance from area β is observed.
- B: In area γ, a small difference in appearance from area β is observed.
- C: In area γ, the difference in appearance from area β is significant.

Storage Stability

As a measure of the stability of the treatment liquid during storage, storage stability was evaluated. Specifically, the freshly prepared treatment liquid was put into a sample bottle and stored at 23° C. for 3 days. The stored treatment liquid was visually observed, and the appearance was rated against the criteria below.
- A: No phase separation is observed.
- B: Phase separation is observed but disappears after shaking.
- C: Phase separation is observed and remains after shaking.

TABLE 4

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Color appearance | A | B | B | B | A | B | C | A | A | C | A |
| Strike-through | A | A | A | A | A | A | A | A | A | A | B |
| Abrasion resistance | A | A | B | B | A | A | A | A | A | A | A |
| Texture | A | A | A | A | A | A | A | B | A | A | A |
| Pretreatment spots | B | B | A | A | B | B | B | B | B | B | B |
| Storage stability | B | B | A | A | B | B | B | B | B | B | B |

|  | Example 12 | Example 13 | Example 14 | Example 15 | Example 16 | Example 17 | Example 18 | Example 19 | Example 20 | Example 21 |
|---|---|---|---|---|---|---|---|---|---|---|
| Color appearance | C | A | B | B | B | C | A | A | C | A |
| Strike-through | A | A | A | A | A | A | A | A | A | B |
| Abrasion resistance | A | A | A | B | A | A | A | A | A | A |
| Texture | A | A | A | A | A | A | B | A | A | A |
| Pretreatment spots | B | B | B | A | B | B | B | B | B | B |
| Storage stability | B | A | A | A | A | A | A | A | A | A |

TABLE 4-continued

|  | Example 22 | Example 23 | Example 24 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Color appearance | C | B | A | D | D | E | D | D | E | E |
| Strike-through | A | B | A | A | A | A | A | C | C | C |
| Abrasion resistance | A | A | B | A | A | A | A | ND | ND | ND |
| Texture | A | B | A | A | A | A | A | A | A | A |
| Pretreatment spots | B | B | B | B | B | B | B | B | A | A |
| Storage stability | A | A | A | A | A | A | A | A | A | A |

As shown in Table 4, Examples 1 to 24 achieved a grade C, which corresponds to "acceptable," or better grade in the test of color appearance (whiteness) across all formulas and all printing conditions. In particular, when the amount of specified compound in the treatment liquid was 2% by mass or more, the amount of white pigment ink A attached was 300 g/m² or more, and the heating temperature in S4 was 130° C. or less, the grade was at least B, which corresponds to "good." It was therefore shown that a treatment liquid containing a specified compound improves color appearance on polyester fabric.

In the test for strike-through, Examples 11 and 21, in which the amount of white pigment ink A attached was 500 g/m², and Example 23, in which the amount of cationic compound (calcium chloride dihydrate) was reduced to 7.0% by mass, were graded as B but all other Examples achieved a grade A, indicating that treatment liquids according to an aspect of the invention make the strike-through of white pigment less frequent.

In the test of abrasion resistance, the Examples in which the treatment liquid contained a resin emulsion (Examples other than Examples 3, 4, 15, and 24) achieved a grade A, which corresponds to "suitable," indicating that treatment liquids according to an aspect of the invention improve abrasion resistance. In the test of texture, Examples 8 and 18, in which the amount of specified compound was 4.5% by mass, and Example 23, in which the amount of cationic compound (calcium chloride dihydrate) was reduced to 7.0% by mass, were graded as B but all other Examples achieved a grade A, indicating that treatment liquids according to an aspect of the invention do not affect the texture of the material (polyester fabric). In the test for pretreatment spots, the grade was B or better for all Examples.

In the test of storage stability, the treatment liquids containing a resin emulsion and in which the specified compound was a polyethylene oxide, carboxymethyl cellulose, or hydroxyethyl cellulose (Examples 1, 2, and 5 to 12) were graded B, or "good," and the other Examples achieved a grade A, or "suitable."

By contrast, Comparative Examples were inferior to Examples in terms of color appearance, as the color appearance grade was D, which corresponds to "unsuitable," or E, which corresponds to "extremely unsuitable," across all formulas and all printing conditions. In the test for strike-through, Comparative Example 5, in which the amount of white pigment ink A attached was 500 g/m², and Comparative Examples 6 and 7, in which the treatment liquid contained no cationic compound, were graded as C, indicating that the treatment liquids of Comparative Examples do not prevent strike-through effectively.

The entire disclosure of Japanese Patent Application No. 2017-128487, filed Jun. 30, 2017 is expressly incorporated by reference herein.

What is claimed is:

1. A treatment liquid composition for use in ink jet pigment textile printing and used by attaching the composition to fabric, the composition comprising:
    at least one cationic compound;
    at least one compound selected from polyvinylpyrrolidones, polyethylene oxides, carboxymethyl celluloses, hydroxyethyl celluloses, and polyvinyl alcohols;
    a surfactant having an HLB of 13 or more, and
    water, wherein
    the fabric contains polyester.

2. The treatment liquid composition according to claim 1, wherein the composition is for use in textile printing with a white pigment ink.

3. An ink jet textile printing method comprising attaching the treatment liquid composition according to claim 2 to fabric.

4. The treatment liquid composition according to claim 1, wherein the fabric is colored fabric.

5. An ink jet textile printing method comprising attaching the treatment liquid composition according to claim 4 to fabric.

6. The treatment liquid composition according to claim 1, wherein the at least one cationic compound is at least one of multivalent metal salts and cationic polymers.

7. An ink jet textile printing method comprising attaching the treatment liquid composition according to claim 6 to fabric.

8. The treatment liquid composition according to claim 1, wherein an amount of the at least one compound selected from polyvinylpyrrolidones, polyethylene oxides, carboxymethyl celluloses, hydroxyethyl celluloses, and polyvinyl alcohols is 0.5% by mass or more and 6.0% by mass or less of a total mass of the treatment liquid composition.

9. An ink jet textile printing method comprising attaching the treatment liquid composition according to claim 8 to fabric.

10. The treatment liquid composition according to claim 1, the composition further comprising fine particles of resin.

11. An ink jet textile printing method comprising attaching the treatment liquid composition according to claim 10 to fabric.

12. An ink jet textile printing method comprising attaching the treatment liquid composition according to claim 1 to fabric.

13. The ink jet textile printing method according to claim 12, the method further comprising, after the attaching the treatment liquid composition to the fabric, heating at a temperature of 140° C. or less.

14. The ink jet textile printing method according to claim 12, the method further comprising attaching a white pigment ink by ink jetting to a region to which the treatment liquid composition has been attached.

15. The ink jet textile printing method according to claim 14, wherein an amount of the white pigment ink attached to the fabric is 500 g/m$^2$ or less.

16. The treatment liquid composition according to claim 1, wherein the composition is colorless.

17. The treatment liquid composition according to claim 1, wherein the amount of the surfactant is 0.01% by mass or more and 0.3% by mass or less relative to a total mass of the treatment liquid.

18. The treatment liquid composition according to claim 1, wherein the surfactant is at least one selected from an acetylene-glycol surfactant, a fluorinated surfactant, and a silicone surfactant.

* * * * *